United States Patent
Guo et al.

(10) Patent No.: US 10,592,368 B2
(45) Date of Patent: Mar. 17, 2020

(54) MISSING VALUES IMPUTATION OF SEQUENTIAL DATA

(71) Applicant: International Business Machines Corporation, Armonk, NY (US)

(72) Inventors: Shi Jing Guo, Beijing (CN); Xiang Li, Beijing (CN); Hai Feng Liu, Beijing (CN); Jing Mei, Beijing (CN); Zhi Qiao, Beijing (CN); Guo Tong Xie, Xi Er Qi (CN); Shi Wan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 15/794,988

(22) Filed: Oct. 26, 2017

(65) Prior Publication Data
US 2019/0129819 A1    May 2, 2019

(51) Int. Cl.
| | |
|---|---|
| *G06F 11/22* | (2006.01) |
| *G06N 3/04* | (2006.01) |
| *G06N 3/08* | (2006.01) |
| *G06F 11/263* | (2006.01) |

(52) U.S. Cl.
CPC ........ *G06F 11/2263* (2013.01); *G06F 11/263* (2013.01); *G06N 3/0445* (2013.01); *G06N 3/0454* (2013.01); *G06N 3/08* (2013.01)

(58) Field of Classification Search
CPC .... G06F 11/22; G06F 11/2263; G06F 11/263; G06N 3/04; G06N 3/08

USPC .................................. 714/26; 705/3; 706/12
See application file for complete search history.

(56) References Cited

U.S. PATENT DOCUMENTS

| | | | | |
|---|---|---|---|---|
| 5,956,519 | A * | 9/1999 | Wise ...................... | G06F 9/3867 712/16 |
| 7,529,721 | B2 | 5/2009 | Jannarone et al. | |
| 9,443,194 | B2 * | 9/2016 | Chu ....................... | G06N 5/025 |
| 9,536,206 | B2 | 1/2017 | Harik | |
| 2008/0133275 | A1 | 6/2008 | Haug | |
| 2011/0105852 | A1 | 5/2011 | Morris | |

(Continued)

OTHER PUBLICATIONS

Pascal Vincent et al., "Stacked Denoising Autoencoders: Learning Useful Representations in a Deep Network with a Local Denoising Criterion," Journal of Machine Learning Research 11 (2010) 3371-3408.

(Continued)

*Primary Examiner* — Kamini B Patel
(74) *Attorney, Agent, or Firm* — Intelletek Law Group, PLLC; Gabriel Daniel, Esq.

(57) ABSTRACT

A method and system of imputing corrupted sequential data is provided. A plurality of input data vectors of a sequential data is received. For each input data vector of the sequential data, the input data vector is corrupted. The corrupted input data vector is mapped to a staging hidden layer to create a staging vector. The input data vector is reconstructed based on the staging vector, to provide an output data vector. adjusted parameter of the staging hidden layer is iteratively trained until it is within a predetermined tolerance of a loss function. A next input data vector of the sequential data is predicted based on the staging vector. The predicted next input data vector is stored.

20 Claims, 9 Drawing Sheets

(56) References Cited

U.S. PATENT DOCUMENTS

| | | | | |
|---|---|---|---|---|
| 2012/0185414 | A1* | 7/2012 | Pyle | G01W 1/10 706/11 |
| 2014/0207493 | A1* | 7/2014 | Sarrafzadeh | A61B 5/7264 705/3 |
| 2015/0088907 | A1 | 3/2015 | Li | |
| 2015/0234997 | A1* | 8/2015 | Sarrafzadeh | G06F 19/3418 705/2 |
| 2016/0117605 | A1* | 4/2016 | Pearse | G06F 17/175 706/12 |
| 2016/0148103 | A1* | 5/2016 | Sarrafzadeh | G06K 9/00348 706/46 |
| 2017/0053644 | A1* | 2/2017 | Rennie | G06N 3/08 |
| 2017/0148226 | A1* | 5/2017 | Zhang | G06F 17/5081 |
| 2017/0206464 | A1 | 7/2017 | Clayton et al. | |
| 2017/0316324 | A1* | 11/2017 | Barrett | G06Q 10/04 |
| 2018/0197089 | A1* | 7/2018 | Krasser | G06N 5/04 |
| 2018/0198800 | A1* | 7/2018 | Krasser | H04L 63/145 |
| 2019/0026466 | A1* | 1/2019 | Krasser | G06F 21/566 |
| 2019/0130226 | A1* | 5/2019 | Guo | G06K 9/6298 |

OTHER PUBLICATIONS

Zhengping Che et al., "Recurrent Neural Networks for Multivariate Time Series With Missing Values," Cornell University Library, Computer Science, arXiv:1606.01865[cs.LG], Nov. 7, 2016, 14 pages.

Peter Mell et al., "The NIST Definition of Cloud Computing," Recommendations of the National Institute of Standards and Technology, National Institute of Standards and Technology Special Publication 800-145 7 pages (Sep. 2011).

Brett K. Beaulieu-Jones et al., "Missing Data Imputation in the Electronic Health Record Using Deeply Learned Autoencoders," Pacific Symposium on Biocomputing 2017, pp. 207-218.

Kyunghyun Cho, et al., Learning Phrase Representations using RNN Encoder-Decoder for Statistical Machine Translation, arXiv:1406.10783v3 [cs.CL] Sep. 3, 2014.

Pascal Vincent et al., "Extracting and Composing Robust Features with Denoising Autoencoders," Proceedings of the 25th International Conference on Machine Learning, Helsinki, Finland, 2008, 8 pages.

* cited by examiner

MISSING VALUES IMPUTATION OF SEQUENTIAL DATA

BACKGROUND

Technical Field

The present disclosure generally relates to data processing, and more particularly, to imputing missing values in sequential data.

Description of the Related Art

In recent years, electronic health records (EHRs) based on patient data have become an increasingly relevant resource in Real World Evidence (RWE) analysis. RWE relates to data that is derived from medical practice among heterogenous sets of patients in real life practice settings. Such patient data has privacy and security concerns for safeguarding medical information and are therefore is difficult to share across different organizations. Further, EHR is longitudinal and frequently incomplete, where many relevant values are missing. Missing data is prevalent in the EHR for several reasons. For example, EHRs are configured for clinical and billing purposes, thereby leaving out data points that would be meaningful for medical research. However, research institutes, industry companies, and other healthcare stakeholders are eager to access such sensitive data to harvest useful insights and/or develop helpful tools/models therefrom.

SUMMARY

According to various embodiments, a computing device, a non-transitory computer readable storage medium, and a method are provided to impute corrupted sequential data. A plurality of input data vectors of a sequential data is received. For each input data vector of the sequential data, the input data vector is corrupted. The corrupted input data vector is mapped to a staging hidden layer to create a staging vector. The input data vector is reconstructed based on the staging vector, to provide an output data vector. A parameter of the staging hidden layer is iteratively trained until the output data vector is within a predetermined tolerance of a loss function. A next input data vector of the sequential data is predicted based on the staging vector and stored.

In one embodiment, predicting the next input data vector of the sequential data comprises, for each input data vector of the sequential data receiving, by a prediction hidden layer: (i) an output of a previous prediction hidden layer, and (ii) and output of its adjusted staging hidden layer. Further, the predicted next input data vector of the sequential data is created by the prediction hidden layer. The predicted next input data vector is iteratively adjusted until the predicted second input data vector is within a predetermined tolerance of a second loss function.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to predictive models for sequential data. Thus, the data is provided in an orderly way, thereby attributing a temporal relationship to the data. In the analysis of sequential data, the data is evaluated in a predetermined order, thereby allowing the data to be analyzed as it changes over time. The predictive models discussed herein are created to accommodate sequential data that include missing and/or corrupted values. Corrupted data can be recovered by way of a denoising auto-encoder and autoregressive recurrent neural network (RNN) that work in harmony to provide two separate predictions of the missing/corrupted data. In various embodiments, either data can be used or both can be combined by way of weighted average to provide a more reliable calculated output.

The denoising autoencoder is initially trained by (e.g., stochastically) corrupting data sets and inputting them into a neural network. The autoencoder can then be trained against the original data. One way to corrupt the data would be simply to randomly remove some parts of the data, so that the autoencoder is trying to predict the missing input. The autoencoder is also trained to predict the next value based on a hidden layer that receives inputs from a hidden layer of a previous state of the sequential data and an output of a staging hidden layer from a present state. Reference now is made in detail to the examples illustrated in the accompanying drawings and discussed below.

Example Architecture

Figure 1:
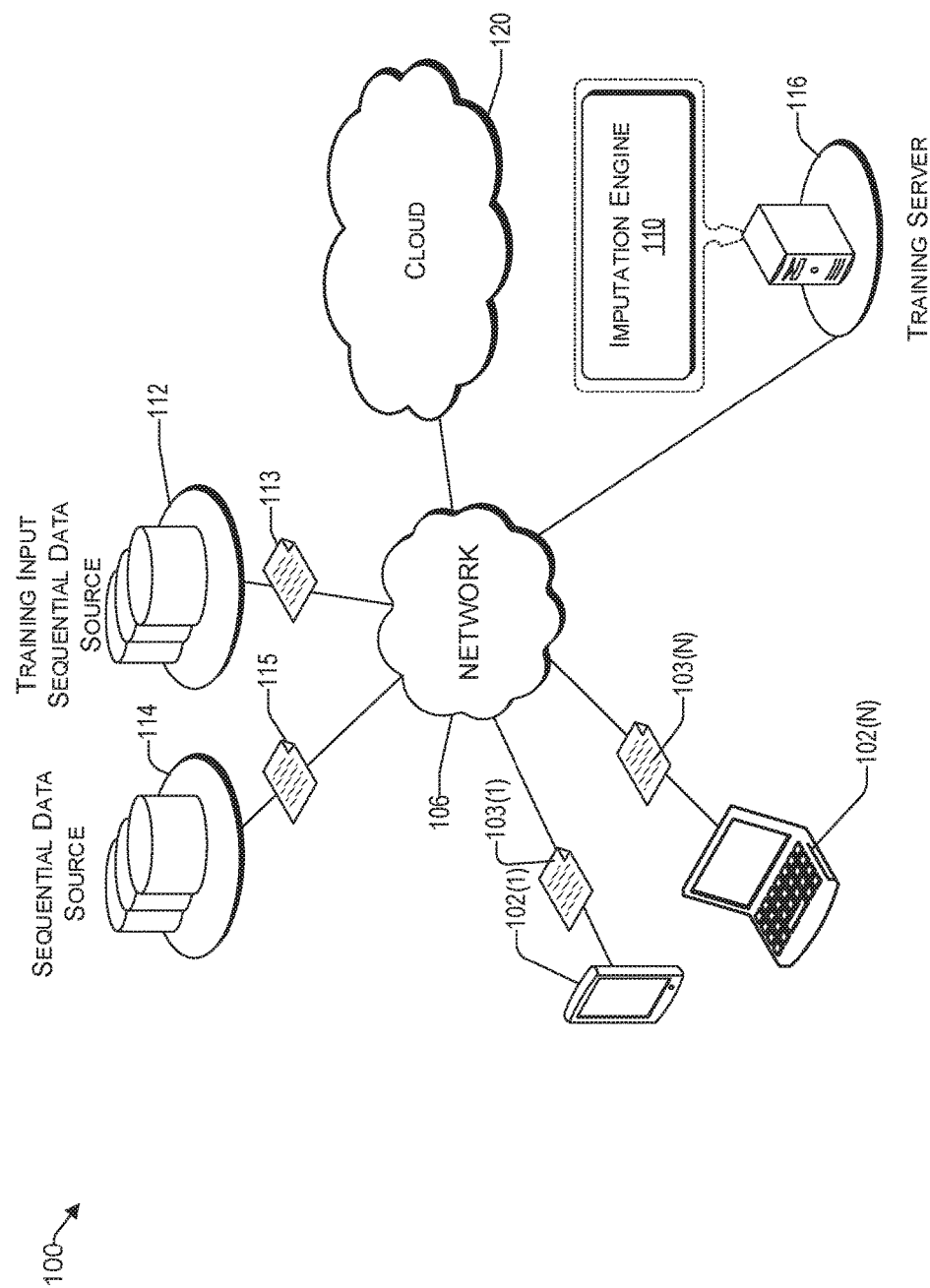
FIG. 1 illustrates an example architecture for implementing a system of imputing missing values of sequential data.

FIG. 1 illustrates an example architecture 100 for implementing a system of imputing missing values of sequential data. Architecture 100 includes a network 106 that allows various computing devices 102(1) to 102(N) to communicate with each other, as well as other elements that are connected to the network 106, such as a sequential data source 112 that is configured to provide sequential training data 113, a sequential data source 114, that may provide corrupted sequential data 115 that is to be processed by the imputation engine 110. In various embodiments, the sequential data 115 may be received and processed at predetermined intervals (e.g., as the data becomes available) or in batch.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows the imputation engine 110, which is a software program running on the training server 116, to communicate with the training input sequential data source 112 to receive sequential training data 113 therefrom. Based on this sequential training data 113, the imputation engine 110 can create one or more models that can later be used to accurately and time efficiently impute (e.g., cure) corrupted/missing data points in sequential data stream. There may be various sequential data sources, including research facilities, hospitals, universities, etc., collectively represented by the sequential data source 114. In one embodiment, the sequential data 115 provided by the sequential data source 114 may include electronic health records (EHRs).

For purposes of later discussion, several user devices appear in the drawing, to represent some examples of the computing devices that may trigger the imputation engine to receive sequential data to create models therefrom and/or to analyze sequential data to provide predictions despite corruption in the data. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(N)) may issue a request 103(N) to the imputation engine 110, such that the imputation engine 110 creates a learning model for a system, such as a healthcare system, a banking system, image recognition system, etc., to create a model that can impute missing data points in a sequential data set.

In one aspect, the architecture 100 is compliant with the Health Insurance Portability and Accountability Act (HIPPA) in that physical and technical safeguards are included by the sequential data source 114, training input sequential data source 112, and/or the imputation engine 110 to limit the access to EHRs to only authorized individuals and account holders. In one example, unique user IDs, automatic log off procedures, encryption, and decryption are required to access any data related to EHRs.

While the training input sequential data source 112, the sequential data source 114, and the training server 116 are illustrated by way of example to be on different platforms, it will be understood that the training data source 112, sequential data source 114, and the training server 116 may be combined in various combinations. In other embodiments, these computing platforms may be implemented by virtual computing devices in the form of virtual machines or software containers that are hosted in a cloud 120, thereby providing an elastic architecture for processing and storage.

Example Denoising Autoencoder

Autoencoders are neural networks that are capable of creating sparse representations of the input data. The denoising autoencoder discussed herein reconstruct data from sequential data that has missing elements or is noisy, collectively referred to herein as corrupted data. A hidden layer is applied to the corrupted data to learn from its salient features. The output of the denoising autoencoder, sometimes referred to herein as a repaired input, is a more accurate representation of the input data prior to its corruption.

Figure 2:
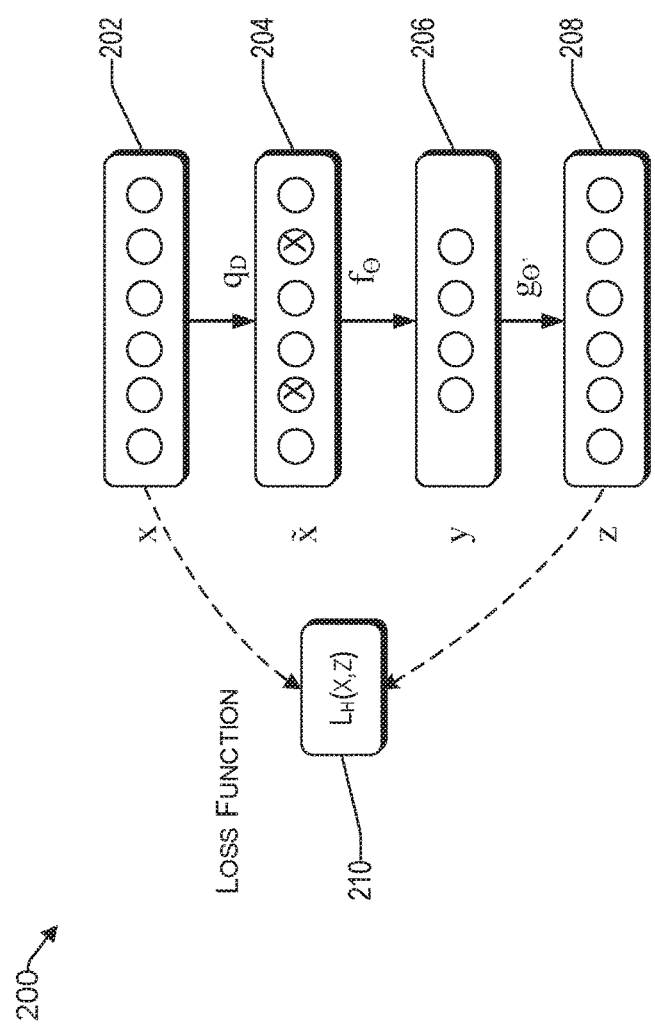
FIG. 2 is conceptual diagram of an example denoising autoencoder.

Reference now is made to FIG. 2, which is conceptual diagram of an example denoising autoencoder 200. The denoising autoencoder 200 is configured to create an output z that closely resembles the input data x. By way of example only, and not by way of limitation, the input data x of FIG. 2 has six variables. To train the autoencoder 200, the input x 202 is stochastically corrupted via function $q_D$ to provide a corrupted input $\tilde{x}$ 204. Thus, the input x 200 is corrupted by way of stochastic mapping $\tilde{x} \sim q_D(\tilde{x}|x)$.

The corrupted input $\tilde{x}$ 204 is then mapped to a hidden layer y 206. For example, $y = f_\theta(\tilde{x}) = s(W\tilde{x}+b)$. The hidden layer y is then used to create an output z 208, which is $g_{\theta'}(y)$. The autoencoder 200 then attempts to reconstruct x from y to create z, such that z is as close as possible to x, as defined by the loss function 210 $L_H(X,Z)$. As used herein a loss function is a function that maps one or more variables onto a real number to represent a cost associated with the one or more variables. An optimization problem then seeks to minimize the loss function (e.g., such that it is within a predetermined tolerance).

Accordingly, the autoencoder 200 iteratively adjusts (i.e., trains) its model by adjusting model parameter W such that reconstructed output z (based on the hidden layer y 206) is within a predetermined tolerance of the uncorrupted input 202. Thus, by adjusting the parameter W, the loss function $L_H$ can be minimized. In this regard, the parameters of the loss function $L_H$ 210 may be selected at random and then optimized by a stochastic gradient descent. As used herein, a stochastic gradient is an algorithm that can iterate through different combination of weights to find the best combination of weights that has an error that is within a tolerance of the loss function $L_H$ 210.

In this way, the model learned by the denoising autoencoder can identify a representation of an input z (i.e., an uncorrupted version of input data x) whenever a corrupted input data $\tilde{x}$ 204 is received. While known denoising autoencoders are effective for reconstructing corrupted static data, they do not readily accommodate sequential data.

Example Recurrent Neural Network

A recurrent neural network (RNN) is a type of neural network where connections between units form a predetermined orderly cycle. An RNN is able to analyze data to identify a dynamic temporal behavior. Unlike feedforward neural networks, where connections between the units do not form a cycle, RNNs can use their memory to process arbitrary sequences of inputs. Accordingly, RNN's are particularly useful in determining patterns in data that change over time. For example, in predicting a missing word in a sentence, it is helpful to know the preceding word(s). Thus, RNN' s leverage the dependence of a previous state of an input to determine its next state. In this way, an RNN can learn a probability distribution over a sequence by being trained to predict the next symbol in a sequence.

Figure 3:
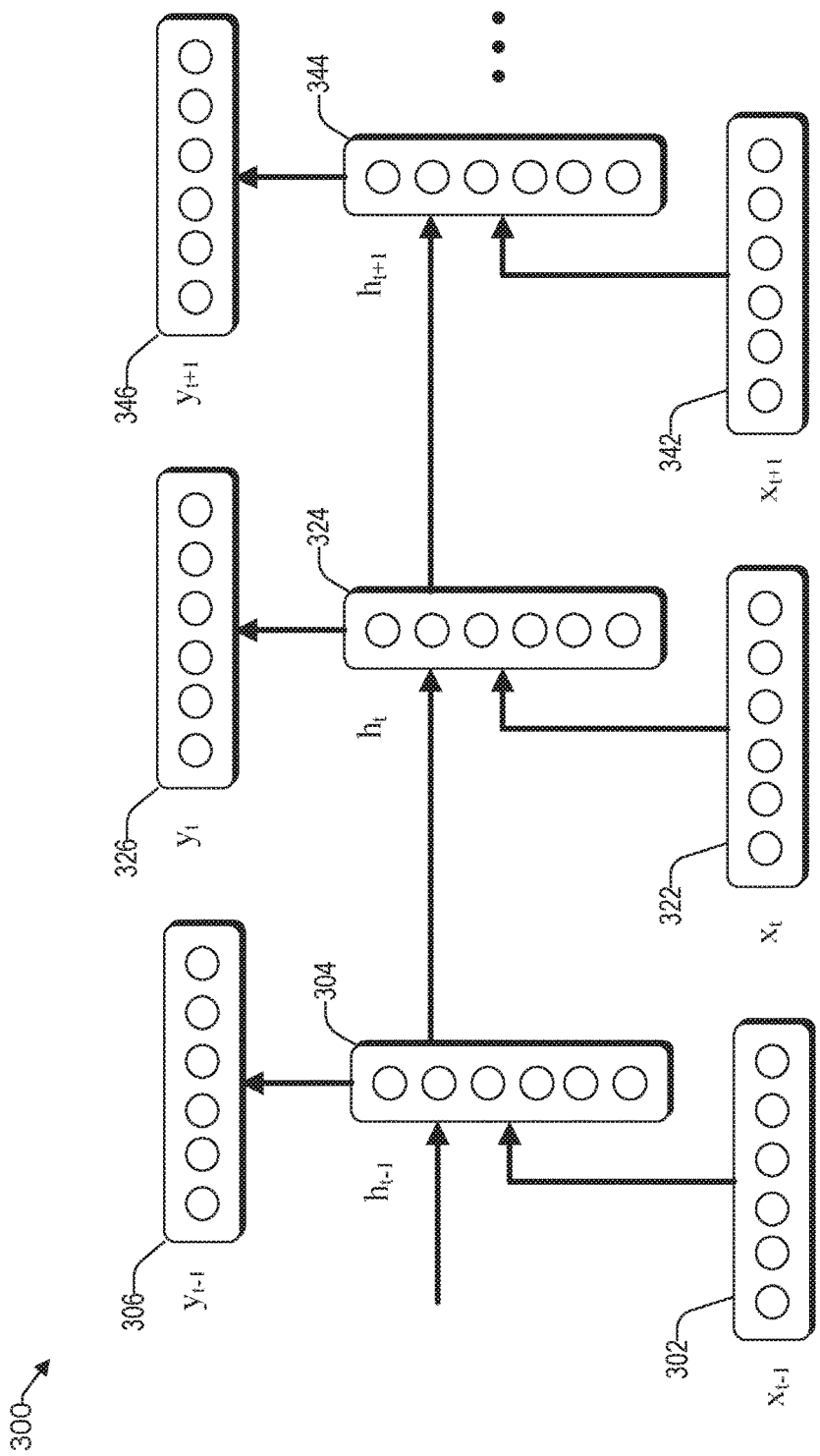
FIG. 3 illustrates an example block diagram of a recurrent neural network (RNN).

FIG. 3 illustrates an example RNN block diagram. The input x (302, 322, 342, etc.,) may vary overtime (i.e., the input x has a temporal relationship). For example, $x_t$ is the input at time t. Input $x_{t-1}$ is at input time t−1 (i.e., before time t), and input $x_{t+1}$ is at a time t+1 (i.e., after time t). For each input, a corresponding hidden layer h, sometimes referred to herein as a hidden layer of the decoder, is applied. For example, $h_t$ 324 is the hidden layer for the data at time t, h 304 is for the data at time t−1 (i.e., before time t), and $h_t$+1 344 is at a time t+1 (i.e., after time t). Each hidden layer (e.g., 304, 324, and 344) is calculated based on the previous hidden layer and the input x at the present step. By way of example, equations 1 and 2 below provide the hidden layers $h_t$ 324 and $h_t$ 344, respectively:

$$h_t = f(h_{(t-1)}, x_t) \quad \text{(Eq. 1)}$$

$$h_{t+1} = f(h_{(t)}, x_{t+1}) \quad \text{(Eq. 2)}$$

Where f is a nonlinearity function.

By way of example, the RNN 300 provides an output at each time step, namely $y_{t-1}$ 306, $y_t$ 326, and $y_{t+1}$ 346. Once the RNN 300 is trained, it can be used to predict outputs $y_{t-1}$ 306, $y_t$ 326, and $y_{t-1}$ 346. While an RNN can predict outputs of temporal data, it typically does not have a way of handling corrupted data. Thus, while there may be separate solutions for imputing missing (e.g., corrupted) data and for creating prediction models for sequential data, these solutions result in a process where imputations are disparate from prediction models, and missing patterns are not efficiently explored, thereby leading to inefficient use of computing resources, as well as suboptimal predictions and analysis.

Example Recurrent Neural Network that Accommodates Corrupted Data

Figure 4A:
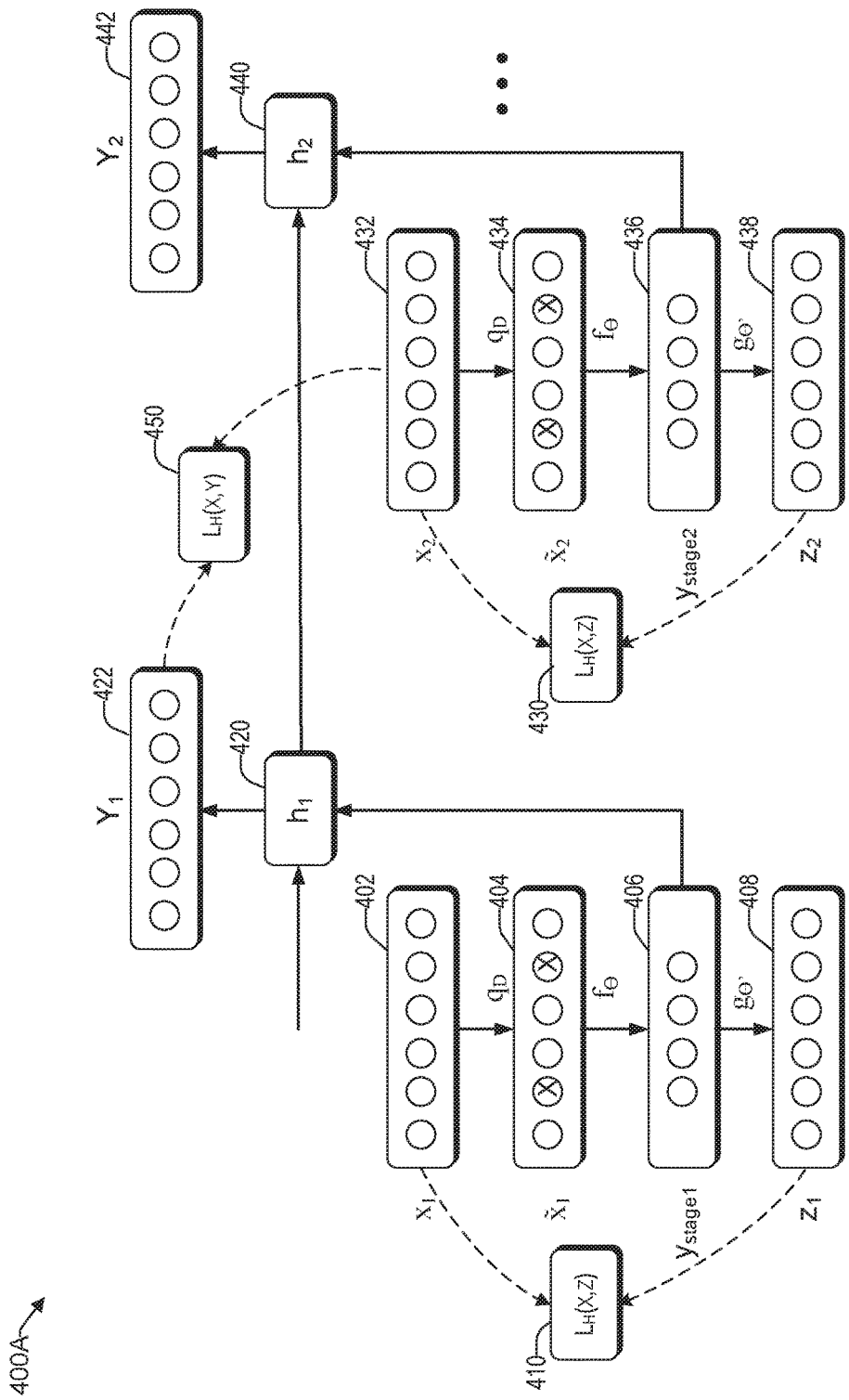
FIG. 4A is a conceptual diagram of an RNN autoencoder system that can be trained to accommodate corrupted sequential input data.

FIG. 4A is a conceptual diagram of an RNN autoencoder system 400A that can be trained to accommodate corrupted sequential input data. By way of example only, and not by way of limitation, two input data vectors $x_1$ 402 and $x_2$ 432 are illustrated, while it will be understood in view of the teachings herein that additional data vectors of a sequential input data can be accommodated as well. Parameter $x_1$ represents input data at time t, while $x_2$ represents data at time t+1, where t+1 is an event that occurs after time t. Stated differently, X is a time series comprising $x_1$, $x_2$, . . . $x_1$, where t is time.

To train the autoencoder system 400A, the input data $x_1$ 402 corresponding to a time t is (e.g., stochastically) corrupted via function $q_D$ to provide a corrupted input $\tilde{x}_1$ 404. Thus, the input data $x_1$ 400 is corrupted by way of stochastic mapping $\tilde{x}_1 \sim q_D(\tilde{x}_1 | x_1)$. In various embodiments, the input data $x_2$ 432, can be processed substantially similar to that of input $x_1$ 402, concurrently or in series (e.g., $x_1$ then $x_2$).

The corrupted input data $\tilde{x}_1$ 404 is then mapped to a hidden layer $y_{stage1}$ 406. For example, $y_{stage1} = f_\theta(x) = s(W\tilde{x}+b)$. The hidden layer $y_{stage1}$ is then used to create $z_1$ 408, which is $g_{\theta'}(y_1)$. The autoencoder system 400A then reconstructs $x_1$ 402 from $y_{stage1}$ 406 to create $z_1$ 408, such that $z_1$ 408 is as close as possible to $x_1$, as defined by the first loss function 410 $Lh_1(x_1, z_1)$. An optimization problem then seeks to minimize the loss function 410 (e.g., such that it is within a predetermined tolerance).

Accordingly, the autoencoder system 400A iteratively adjusts (i.e., trains) its model parameter W of $y_{stage1}$, such that reconstructed output $z_1$ is within a predetermined tolerance of the uncorrupted input data $x_1$ 402. In this regard, the parameters of the loss function $L_H$ 410 may be selected at random and then optimized by a stochastic gradient descent. As used herein, a stochastic gradient is an algorithm that can iterate through different combination of weights to find the best combination of weights that has an error that is within a tolerance of the loss function $L_H$ 410.

Upon optimizing the reconstructed output $z_1$ such that the model can provide an output $z_1$ to be within a tolerance of the loss function 410, the autoencoder system 400A predicts the next symbol in its sequence, namely input data vector $x_2$ 432. Stated differently, the autoencoder system 400A leverages the dependence of a previous state of an input data vector to determine its next state. In this way, an RNN can learn a probability distribution over a sequence of data by being trained to predict the next symbol in the sequence.

For each input $x_1$, $x_2$, etc., there is a corresponding hidden layer $h_1$, $h_2$, etc., that is applied to its corresponding hidden layer $y_{stage}$. For example, $h_1$ 420 is the hidden layer for the data at time t, $h_2$ 440 is the hidden layer for the data at time t+1. Each hidden layer (e.g., 420, 440, etc.,) is calculated based on the previous hidden layer and the hidden layer $y_{stage}$ of its corresponding data. By way of example, equations 1 and 2 below provide the hidden layers $h_1$ 420 and $h_2$ 440, respectively:

$$h_1 = f(h_{(1-previous)}, y_{stage1}) \quad \text{(Eq. 3)}$$

$$h_2 = f(h_1, y_{stage2}) \quad \text{(eq. 4)}$$

Where: f is a nonlinearity function.

The trained autoencoder system 400A can be used to predict outputs $y_1$ 422, $y_2$ 442, etc. For example, output $y_1$ 422 is a prediction of the input x at time t2, represented in FIG. 4 by $x_2$. The hidden layer $h_1$ is iteratively adjusted until output $y_1$ 422 is as close as possible to the input $x_2$ 432. Thus, the autoencoder system 400A iteratively adjusts (i.e., trains) its hidden layer $h_1$ 420 such that the output $y_1$ 422 is within a predetermined tolerance of the input data $x_2$ 432. In this regard, the parameters of the loss function $L_H$ 450 may be optimized by a stochastic gradient descent. In one embodiment, the training process is end to end. Stated differently, the denoising autoencoder and the RNN functions of the autoencoder system 400A are trained concurrently. In an inference stage, the outputs (e.g., y1, y2, etc.,) can then be inferred despite the input data being corrupted.

Accordingly, by virtue of using a denoising auto-encoders (i.e., blocks 402 to 410, and 430 to 438) in combination with autoregressive RNN (e.g., 420, 422, 432, and 450), multi-dimensional input vectors can be recovered in two ways: (i) by way of the denoising auto-encoder and (ii) by way of the autoregressive RNN that work in harmony. In various embodiments, either result can be used as a recovered version of the input data vector, or can be combined by weighted average. In one embodiment, when the result provided by the denoising autoencoder (e.g., $Z_2$ 438— sometimes referred to herein as the next output data vector with respect to $z_1$ 408 and $y_1$ 422) is within a threshold tolerance of the result provided by the RNN (e.g., $y_1$ 422), then the confidence in the recovered result is deemed to be high. In this regard, the stored results may be marked accordingly when stored by the imputation engine 110 of FIG. 1 (e.g., in a memory of the training server or the cloud 120).

In some embodiments, not every hidden layer is required. For example, hidden layer $h_t$ 324 may be skipped, and hidden layer $h_{t-1}$ 304 may be fed directly as an input to hidden layer $h_{t+1}$ 344.

Figure 4B:
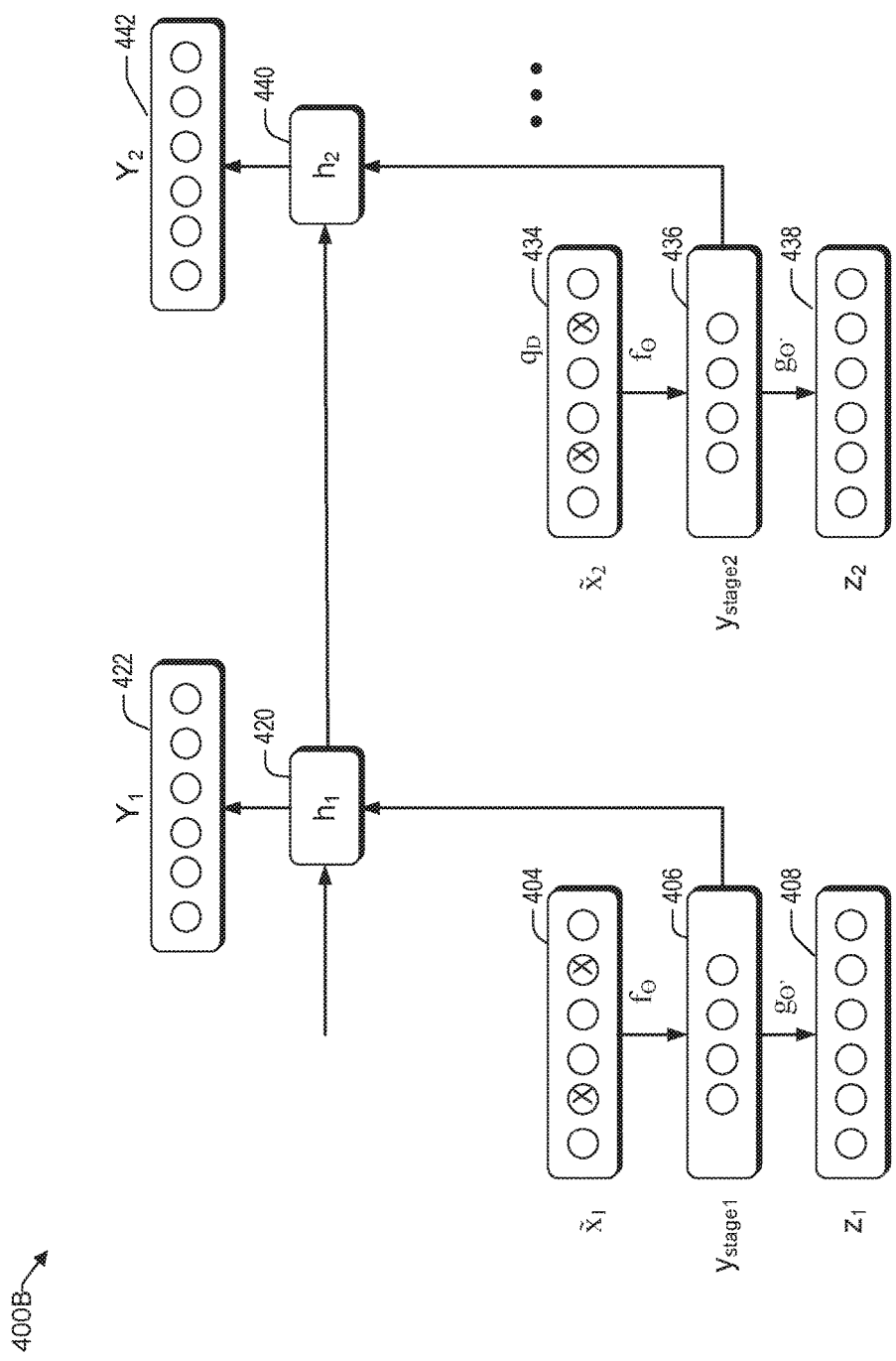
FIG. 4B is a conceptual diagram of a recurrent neural network (RNN) autoencoder system that has already been trained, consistent with an illustrative embodiment.

FIG. 4B is a conceptual diagram of an RNN autoencoder system 400B that has already been trained. Stated differently, while FIG. 4A is in a training phase, the autoencoder system 400B is in an inference phase, where it can process corrupted sequential data that can come from various sources, including sequential data source 114 of FIG. 1. Accordingly, FIG. 4B can be viewed as a simplified version of the conceptual diagram of FIG. 4A that has some training components removed therefrom. The corrupted input data $\tilde{x}_1$ 404 is mapped to a hidden layer $y_{stage1}$ 406. The trained hidden layer $y_{stage1}$ is used to create $z_1$ 408 (a denoised version of the corrupted input data $\tilde{x}_1$ 404. Thus, the autoencoder system 400B creates $z_1$ 408 as a prediction of what the input ($x_1$) is inferred to be, based on the prior training, as discussed in the context of FIG. 4A (e.g., by way of a denoising auto-encoder).

The autoencoder system 400B also predicts the next data vector in its sequence, represented in FIG. 4B by vector $y_1$ (e.g., by way of an RNN). Thus, input data vectors $x_1, x_2, \ldots xn$ can be determined in two ways, namely, (i) by way of the denoising auto-encoder path, and (ii) by way of an RNN. For example, $y_1$ and $z_2$, while determined in different ways, should be similar. In one embodiment, the determination of $y_1$ and $z_1$ is performed concurrently. In various embodiments, either output could be used as the recovered version, or the outputs can be combined by way of weighted average. In one embodiment, upon determining that the predicted next input data vector $y_1$ and the output data vector $z_2$ are within a threshold tolerance, a high confidence level is attributed to both the predicted next input data vector $y_1$ and the output data vector $z_2$.

The systems discussed herein can be used in a variety of applications, including modeling diseases and patient diagnosis in the health care domain, thereby being able to process sequential data that is corrupted. In this way, the autoencoder system 400A/B can identify sequential inputs (i.e., an uncorrupted version of input data x) whenever corrupted sequential data is being processed.

Example Process

Figure 5:
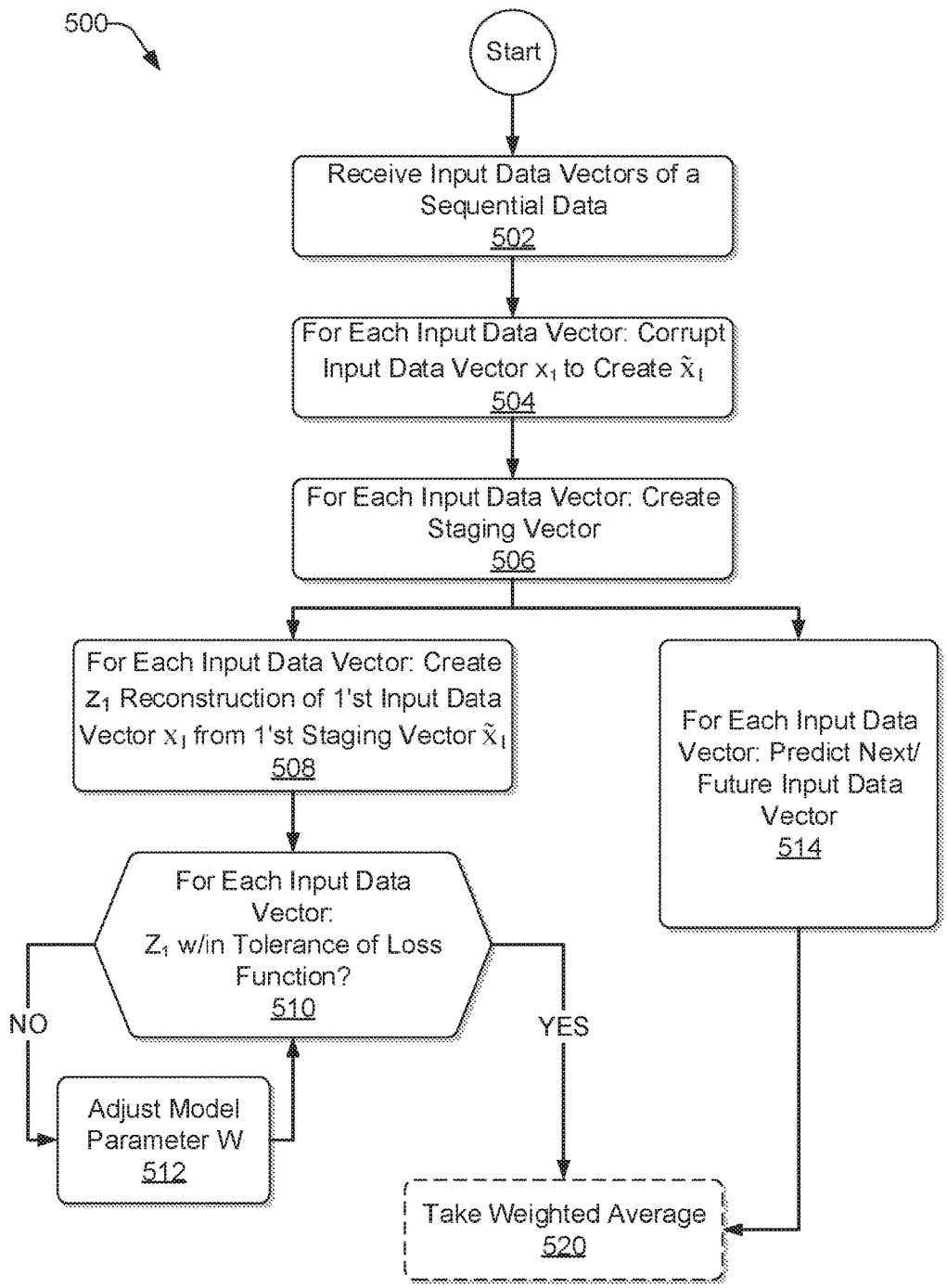
FIG. 5 presents an illustrative process of imputing missing values of sequential data by an imputation engine.

With the foregoing overview of the architecture 100 and the conceptual diagram of an RNN autoencoder systems 400A that can be trained to accommodate corrupted input data and its trained variant 400B, it may be helpful now to consider a high-level discussion of an example process. To that end, FIG. 5 presents an illustrative process 500 of imputing missing values of sequential data by an imputation engine. Process 500 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 500 is described with reference to the architecture 100 of FIG. 1.

At block 502, the imputation engine 110 receives input data vectors of a sequential data. For example, a first input data vector $x_1$ corresponds to a time t of a sequential data vector 113; a second input data vector $x_2$ corresponds to a time t+1 of the sequential data vector 113; etc. Such sequential data can be received from a training input sequential data source 112, which may be a research facility, medical facility, insurance company, etc. In various embodiments, other input data vectors, such as input data vectors corresponding to times t−1, t+1, t+2, etc., can be received (i) within a same data packet as that of the first input data vector $x_1$ or (ii) in separate data packets.

At block 504, for each input data vector, the input data vector (e.g., $x_1$) is corrupted to create a corresponding corrupted input data vector (e.g., $\tilde{x}_1$). In one embodiment, the corruption is stochastic. Corruption may comprise removing or altering one or more dimensions of the input data vector $x_1$. The corrupted input data vector can be used to train the imputation engine 110 to impute future corrupted input data.

At block 506, for each input data vector, a staging vector is created by mapping the corrupted first input data vector $\tilde{x}_1$ to a staging hidden layer.

At block 508, for each input data vector, the input data vector (e.g., $x_1$) is reconstructed based on its corresponding staging vector, thereby creating an output data vector (e.g., $z_1$). In one embodiment, each output data vector (e.g., $z_1$, $z_2$, etc.,) is stored in a memory of the imputation engine 110.

For each input data vector, its output data vector (e.g., $z_1$) is iteratively adjusted by comparison to its corresponding input data vector (e.g., $x_1$) until the output data vector (e.g., $z_1$) is within a predetermined tolerance of a first loss function. Stated differently, the model parameter W of the staging hidden layer is optimized until the output data vector is close to the input data vector. In various embodiments, the first loss function may be the same or different for each input data vector. For example, for each input data vector, at block 510, the imputation engine 110 determines whether the corresponding output data vector (e.g., $z_1$) is within a tolerance of the first loss function. If not (i.e., "NO" at decision block 510), then the process continues with block 512, where the output data vector (e.g., $z_1$) is adjusted to be closer to the corresponding input data vector (e.g., $x_1$) by adjusting the model parameter W of the staging hidden layer. The iteration continues until the output data vector (e.g., $z_1$) is within a predetermined tolerance of the first loss function. In one embodiment, the parameters of the loss function $L_H$ (i.e., block 406 in FIG. 4) may be selected at random and then optimized by a stochastic gradient descent.

Returning to block 506, the staging vector created (by mapping the corrupted first input data vector $\tilde{X}_1$ to a staging hidden layer) can be used to predict the next/future input data vector. To that end, at block 514, the imputation engine 110 predicts a second input data vector (e.g., $y_1$) that corresponds to a time t+1 of the sequential data, based on the present staging vector. Stated differently the imputation engine 110 predicts a second input data vector $y_1$ for a second input data vector that corresponds to a future time period of the sequential data. Such prediction is performed by way of an RNN. In one embodiment, the denoising autoencoder and the RNN functions of the process 500 are used for training the parameters of the staging hidden layer and the prediction hidden layer, concurrently.

In one embodiment, predicting the second input data vector comprises, for each input data vector: a first prediction hidden layer corresponding to the present time t receiving: (i) a prior state of a prediction hidden layer corresponding to a time t−1, and (ii) the corresponding adjusted staging vector. A prediction hidden layer for the present time t, creates a prediction of the next input data vector for a time t+1). Eventually, the predicted next input data vector is iteratively adjusted by the imputation engine 110 until the predicted next input data vector is within a predetermined tolerance of a second loss function. For example, for each input data vector, the parameters of the second loss function may be optimized by a stochastic gradient descent. In one embodiment, each prediction hidden layer is stored in a memory of the training server 116.

In this way, a corrupted data vector can be recovered by two imputations, namely by way of (i) blocks 502 to 512 where the corrupted data is imputed by a denoising autoencoder path and (ii) by block 514 where the corrupted data is imputed by way of an autoregressive RNN path. In one embodiment, the results of the two paths can be combined for a corresponding time of the sequential data by a weighted average of the two results (i.e., block 520). The weighted average can then be stored as an imputed next input data vector.

Example Computer Platform

Figure 6:
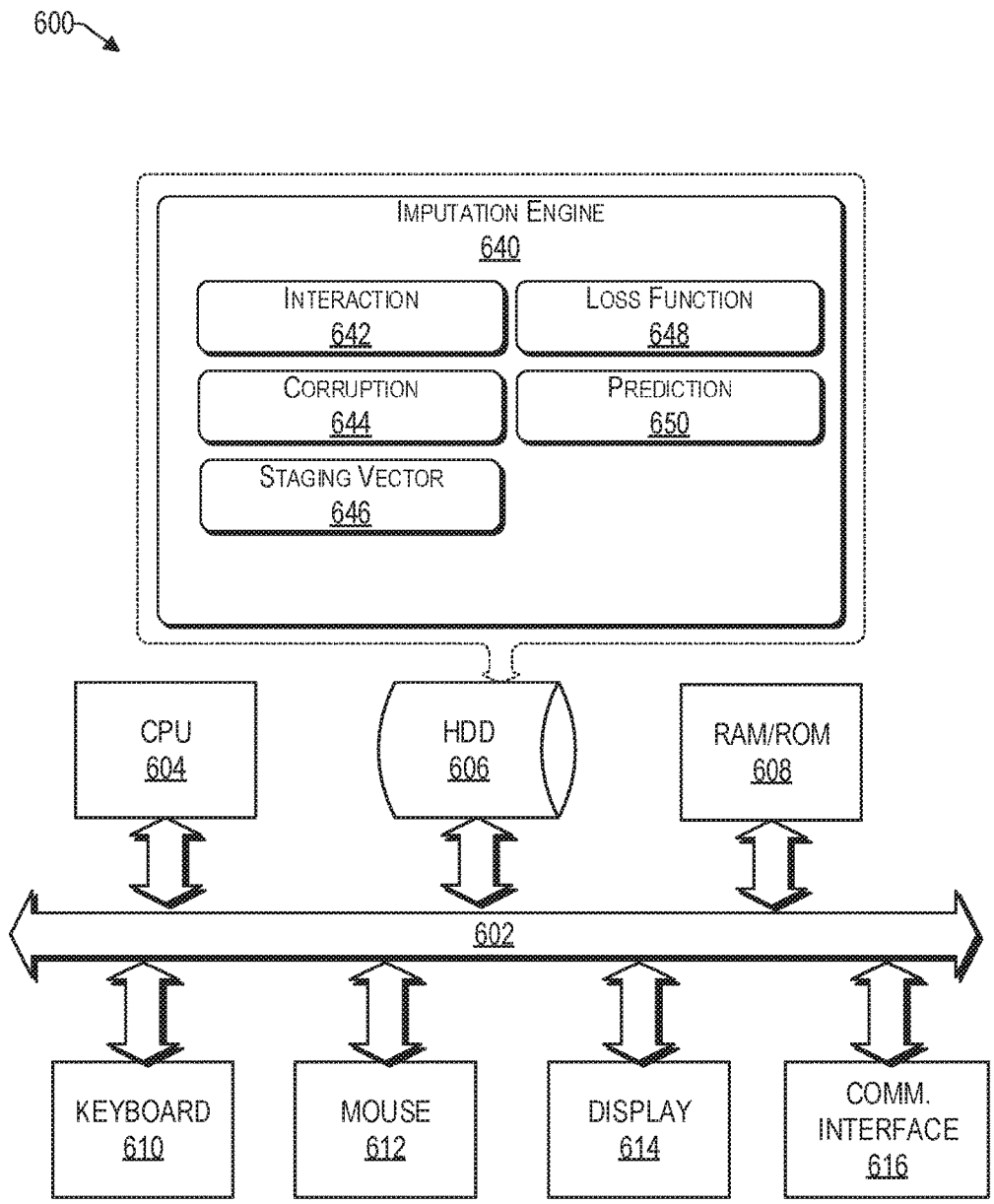
FIG. 6 provides a functional block diagram illustration of a computer hardware platform that is capable of facilitating the imputation or prediction of missing values of sequential data.

As discussed above, functions relating to providing predictive models for sequential data, can be performed with the use of one or more computing devices connected for data communication via wireless or wired communication, as shown in FIG. 1 and in accordance with the process 500 of FIG. 5. FIG. 6 provides a functional block diagram illustration of a computer hardware platform that is capable of facilitating the imputation or prediction of missing data of a sequential data. In particular, FIG. 6 illustrates a network or host computer platform 600, as may be used to implement a server, such as the training server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the imputation engine 640, in a manner described herein. The imputation engine 640 may have various modules configured to perform different functions.

For example, there may be an interaction module 642 that is operative to receive sequential data vectors from various sources, such as sequential data source 114 and the training input sequential data source 112 of FIG. 1. The interaction module 642 can also communicate with various computing devices (e.g., 102(1) to 102(N) that may provide requests for models to be created for sequential data and/or for sequential data to be processed by the imputation engine 110.

In one embodiment, there is a corruption module 644 operative to (e.g., stochastically) corrupt input data vectors such that models can be trained to impute corrupted dimensions of input data vectors. There may be a staging vector module 646 operative to create a staging vector that does not include corrupted dimensions of a corrupted vector. There may be a loss function module 648 operative to map one or more variables onto a real number to represent a cost associated with the one or more variables. The loss function module can then facilitate the optimization of a variable via a gradient descent. There may be a prediction module 650 that is operative to predict an input data vector of a sequential data.

In one embodiment, a program, such as Apache™, can be stored for operating the system as a Web server. In one embodiment, the HDD 606 can store an executing application that includes one or more library software modules, such as those for the Java™ Runtime Environment program for realizing a JVM (Java™ virtual machine).

Example Cloud Platform

As discussed above, functions relating to providing predictive models for sequential data may include a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.
Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
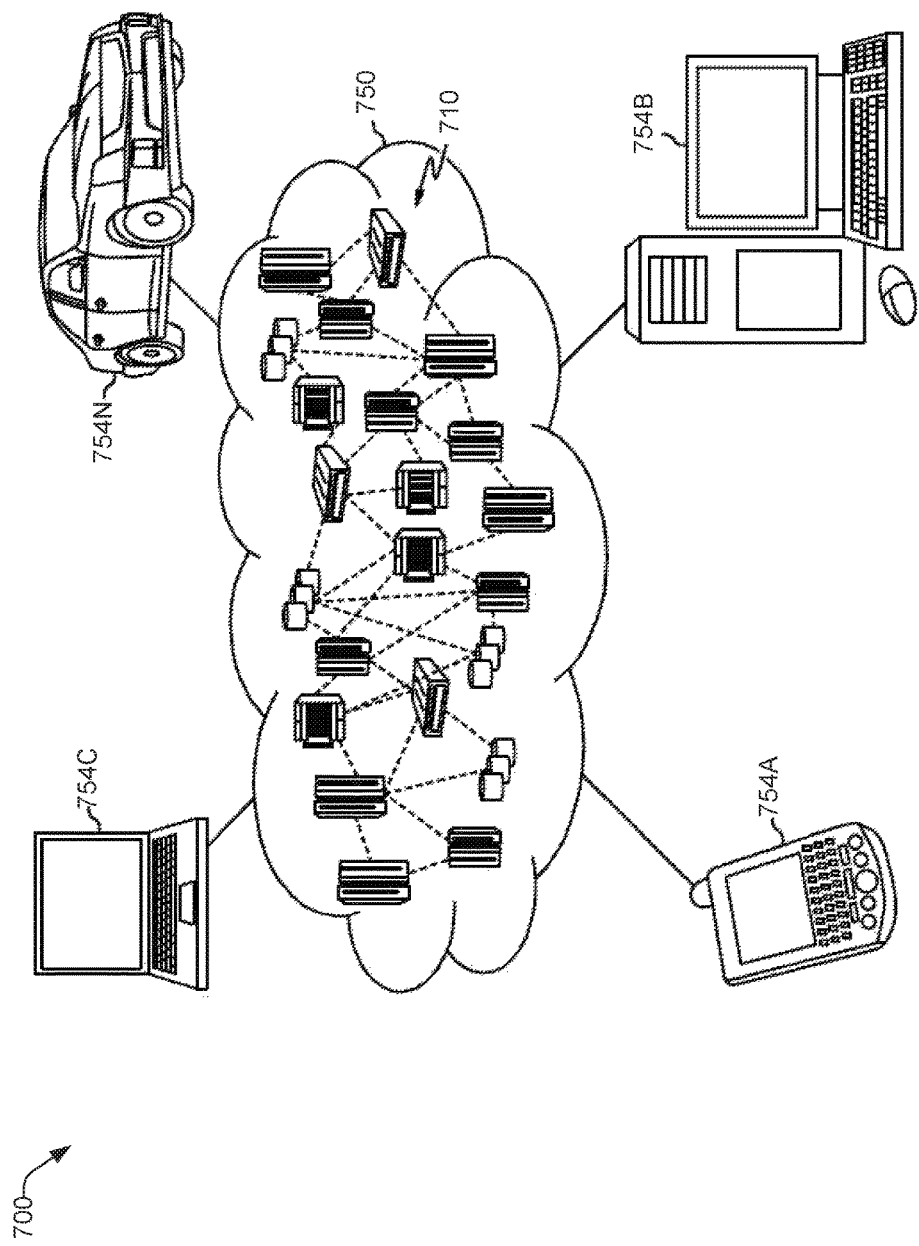
FIG. 7 depicts a cloud computing environment according to an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
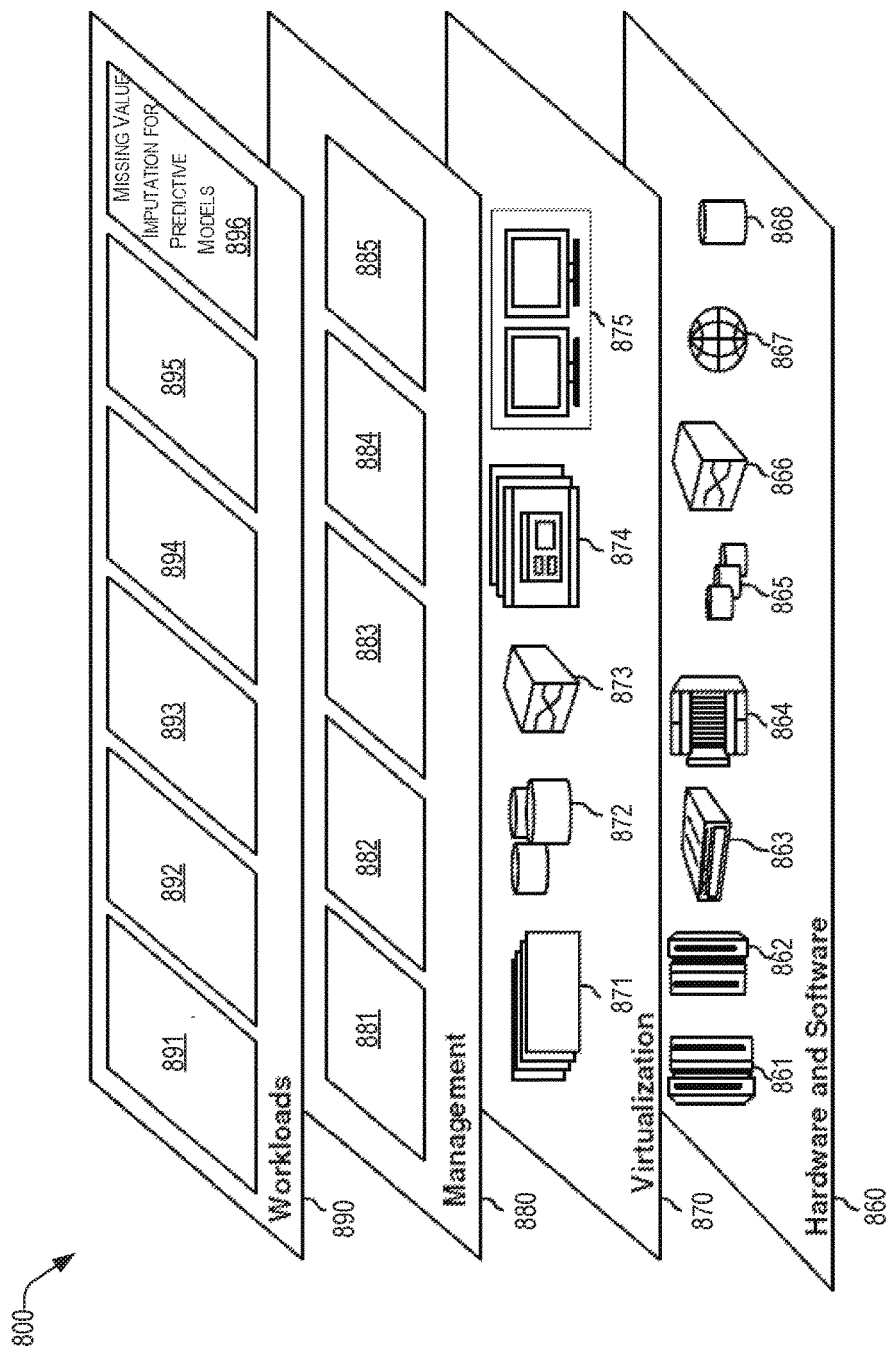
FIG. 8 depicts abstraction model layers according to an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and missing value imputation for predictive models 896.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:
1. A computing device comprising:
a processor;
a network interface coupled to the processor to enable communication over a network;
a storage device coupled to the processor;

an imputation model engine program stored in the storage device, wherein an execution of the program by the processor configures the computing device to perform acts comprising:

receiving a plurality of input data vectors of a sequential data;

for each input data vector of the sequential data:
corrupting the input data vector;
mapping the corrupted input data vector to a staging hidden layer to create a staging vector;
reconstructing the input data vector based on the staging vector to provide an output data vector;
iteratively training a parameter of the staging hidden layer until the output data vector is within a predetermined tolerance of a loss function;
predicting a next input data vector of the sequential data based on the staging vector; and
storing the predicted next input data vector in the storage device.

2. The computing device of claim 1, wherein:
corrupting the input data vector, mapping the corrupted input data vector, reconstructing the input data vector, and iteratively training the parameter of the staging hidden layer, are performed by a denoising autoencoder of the imputation model engine,
predicting the next input data vector of the sequential data is performed by an autoregressive recurrent neural network (RNN) of the imputation model engine, and
the denoising autoencoder and the RNN are performed concurrently.

3. The computing device of claim 1, wherein the plurality of input data vectors of the sequential data relates to electronic health records (EHRs).

4. The computing device of claim 1, wherein the corruption of the input data vector is stochastic.

5. The computing device of claim 1, wherein iteratively training a parameter of the staging hidden layer until the output data vector is within a predetermined tolerance of a loss function, is via a gradient descent.

6. The computing device of claim 1, wherein predicting the next input data vector of the sequential data comprises, for each input data vector of the sequential data:
receiving, by a prediction hidden layer: (i) an output of a previous prediction hidden layer, and (ii) and an output of its adjusted staging hidden layer;
creating, by the prediction hidden layer, the predicted next input data vector of the sequential data; and
iteratively training a parameter of the prediction hidden layer until the predicted next input data vector is within a predetermined tolerance of a second loss function.

7. The computing device of claim 6, wherein execution of the imputation engine by the processor further configures the computing device to perform acts comprising, for each input data vector of the sequential data:
taking a weighted average of the (i) predicted next input data vector and (ii) a next output data vector; and
recording, in the storage device, the weighted average as an imputed next input data vector.

8. The computing device of claim 6, wherein iteratively training a parameter of the prediction hidden layer until the predicted second input data vector is within a predetermined tolerance of a second loss function, is via a gradient descent.

9. The computing device of claim 6, wherein execution of the imputation engine by the processor further configures the computing device to perform acts comprising, for each input data vector of the sequential data: upon determining that the predicted next input data vector and a next output data vector are similar within a threshold tolerance, attributing a high confidence level to the predicted next input data vector and the next output data vector.

10. A non-transitory computer readable storage medium tangibly embodying a computer readable program code having computer readable instructions that, when executed, causes a computer device to carry out a method of imputing corrupted sequential data, the method comprising:
receiving a plurality of input data vectors of a sequential data;
for each input data vector of the sequential data:
corrupting the input data vector;
mapping the corrupted input data vector to a staging hidden layer to create a staging vector;
reconstructing the input data vector based on the staging vector to provide an output data vector;
iteratively training a parameter of the staging hidden layer until the output data vector is within a predetermined tolerance of a loss function;
predicting a next input data vector of the sequential data based on the staging vector; and
storing the predicted next input data vector in the storage device.

11. The non-transitory computer readable storage medium of claim 10, wherein:
corrupting the input data vector, mapping the corrupted input data vector, reconstructing the input data vector, and iteratively training the parameter of the staging hidden layer, are performed by a denoising autoencoder of the imputation model engine,
predicting the next input data vector of the sequential data is performed by an autoregressive recurrent neural network (RNN) of the imputation model engine, and
the denoising autoencoder and the RNN are performed concurrently.

12. The non-transitory computer readable storage medium of claim 10, wherein the plurality of input data vectors of the sequential data relates to electronic health records (EHRs).

13. The non-transitory computer readable storage medium of claim 10, wherein the corruption of the input data vector is stochastic.

14. The non-transitory computer readable storage medium of claim 10, wherein iteratively training a parameter of the staging hidden layer until the reconstructed input data vector is within a predetermined tolerance of a loss function is via a gradient descent.

15. The non-transitory computer readable storage medium of claim 10, wherein predicting the next input data vector of the sequential data comprises, for each input data vector of the sequential data:
receiving, by a prediction hidden layer: (i) an output of a previous prediction hidden layer, and (ii) and an output of its adjusted staging hidden layer;
creating, by the prediction hidden layer, the predicted next input data vector of the sequential data; and
iteratively training a parameter of the prediction hidden layer until the predicted next input data vector is within a predetermined tolerance of a second loss function.

16. The non-transitory computer readable storage medium of claim 15, further comprising, for each input data vector of the sequential data:
taking a weighted average of the (i) predicted next input data vector and (ii) a next output data vector; and
recording, in the storage device, the weighted average as an imputed next input data vector.

17. The non-transitory computer readable storage medium of claim 15, wherein iteratively training a parameter of the prediction hidden layer until the predicted second input data vector is within a predetermined tolerance of a second loss function, is via a gradient descent.

18. The non-transitory computer readable storage medium of claim 15, further comprising, for each input data vector of the sequential data: upon determining that the predicted next input data vector and a next output data vector are similar within a threshold tolerance, attributing a high confidence level to the predicted next input data vector and the next output data vector.

19. A method of imputing corrupted values in a sequential data, the method comprising:
    receiving a plurality of input data vectors of a sequential data;
    for each input data vector of the sequential data:
        corrupting the input data vector;
        mapping the corrupted input data vector to a staging hidden layer to create a staging vector;
        reconstructing the input data vector based on the staging vector to provide an output data vector;
        iteratively training a parameter of the staging hidden layer until the output data vector is within a predetermined tolerance of a loss function;
        predicting a next input data vector of the sequential data based on the staging vector; and
        storing the predicted next input data vector in the storage device.

20. The method of claim 19, wherein:
    corrupting the input data vector, mapping the corrupted input data vector, reconstructing the input data vector, and iteratively training the parameter of the staging hidden layer, are performed by a denoising autoencoder of the imputation model engine;
    predicting the next input data vector of the sequential data is performed by an autoregressive recurrent neural network (RNN) of the imputation model engine;
    the denoising autoencoder and the RNN are performed concurrently; and
    predicting the next input data vector of the sequential data comprises, for each input data vector of the sequential data:
        receiving, by a prediction hidden layer: (i) an output of a previous prediction hidden layer, and (ii) and an output of its adjusted staging hidden layer;
        creating, by the prediction hidden layer, the predicted next input data vector of the sequential data; and
        iteratively training a parameter of the prediction hidden layer until the predicted next input data vector is within a predetermined tolerance of a second loss function.

* * * * *